June 21, 1927. 1,632,942

M. ALMA ET AL

REPOSITIONING DEVICE FOR SWINGING COUPLING HEADS ON RAILROAD VEHICLES

Filed Aug. 30, 1926 2 Sheets-Sheet 1

Inventors:
Maximilian Alma
Carl Egon Alma
By Henry Orth Jr. Atty.

June 21, 1927.

M. ALMA ET AL 1,632,942

REPOSITIONING DEVICE FOR SWINGING COUPLING HEADS ON RAILROAD VEHICLES

Filed Aug. 30, 1926  2 Sheets-Sheet 2

Inventors.
Maximilian Alma
Carl Egon Alma
By Henry Orth Jr.
Atty

Patented June 21, 1927.

1,632,942

UNITED STATES PATENT OFFICE.

MAXIMILIAN ALMA AND CARL EGON ALMA, OF VIENNA, AUSTRIA.

REPOSITIONING DEVICE FOR SWINGING COUPLING HEADS ON RAILROAD VEHICLES.

Application filed August 30, 1926, Serial No. 132,548, and in Austria June 24, 1926.

In order to ensure the safe passage of railway vehicles around curves in the track, the coupling heads of many such vehicles are adapted for lateral swinging movements. Accordingly, the drawbar and buffer mechanism, whether or not it extends throughout the whole length of the vehicle, comprises parts which are displaceable only in the longitudinal axis of said vehicle and a shaft, carrying the coupling head, pivotally connected to these parts (by means of a vertical bolt or otherwise). If the coupling heads be so arranged that coupling between two adjoining vehicles takes place automatically, it is essential that after uncoupling the shaft of a buffer head which has been displaced slightly to one side, should return to the normal or central position automatically and, for this purpose, a special re-positioning device is requisite. In re-positioning devices of this kind, the spring for effecting return of the coupling head to the central position abuts, when the coupling head shaft is swung sideways, against the frame of the vehicle, thereby setting up excessive and undesirable lateral stresses in the said frame whenever the coupling head is so displaced from its normal position.

In the re-positioning device which forms the subject of the present invention this disadvantage is avoided by arranging the spring upon a part of the drawbar mechanism which is displaceable only along the longitudinal axis of the vehicle, or along a parallel to said longitudinal axis, said spring abutting against the part in question. Furthermore the device may be so constructed as to occupy very little space laterally and so can be disposed between longitudinal bearers arranged close together adjacent the centre line of the vehicle.

Figure 1:
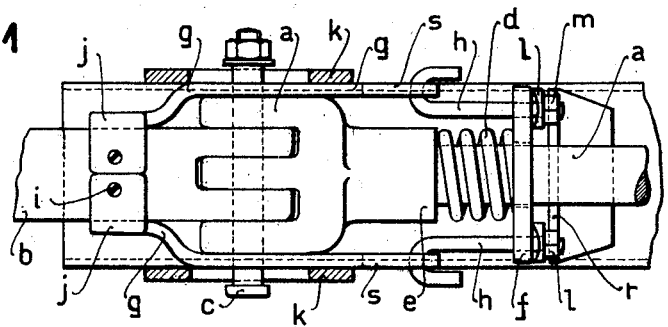
Figure 2:
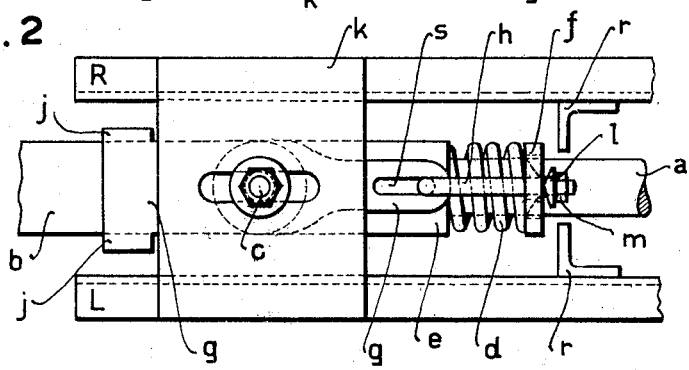
Figure 3:
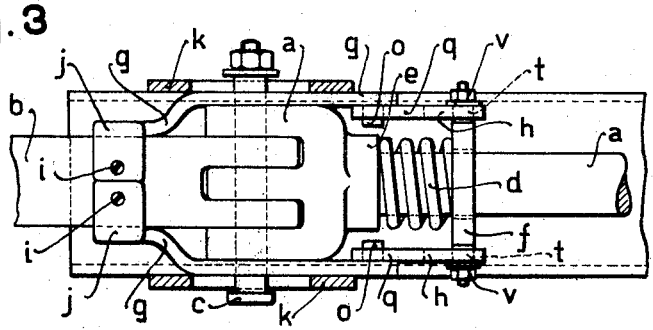
Figure 4:
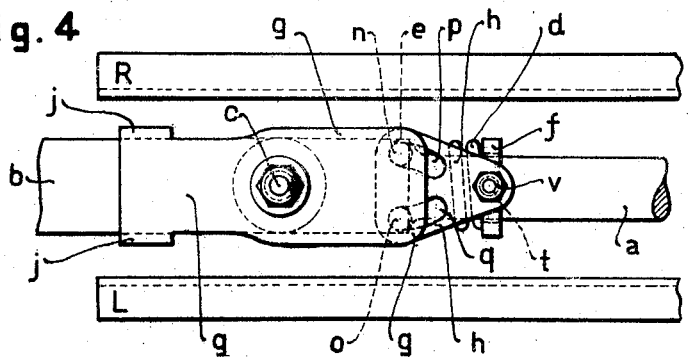
Figure 5:
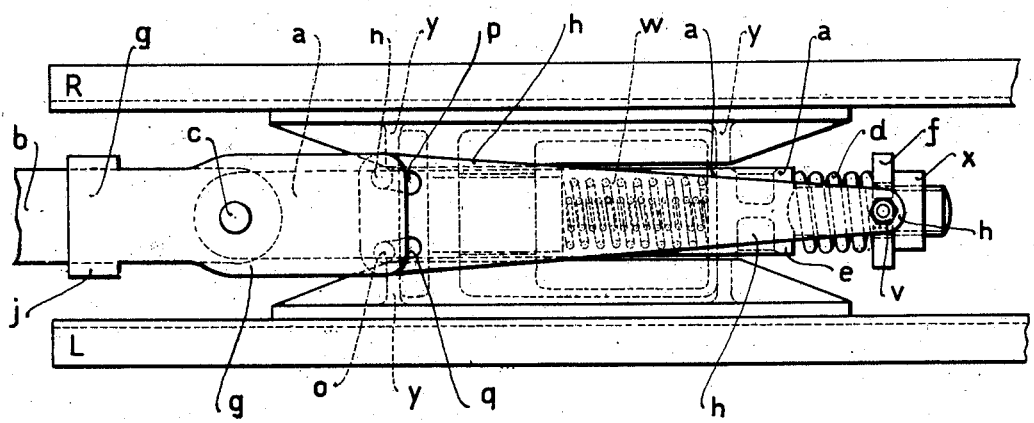
Figure 6:
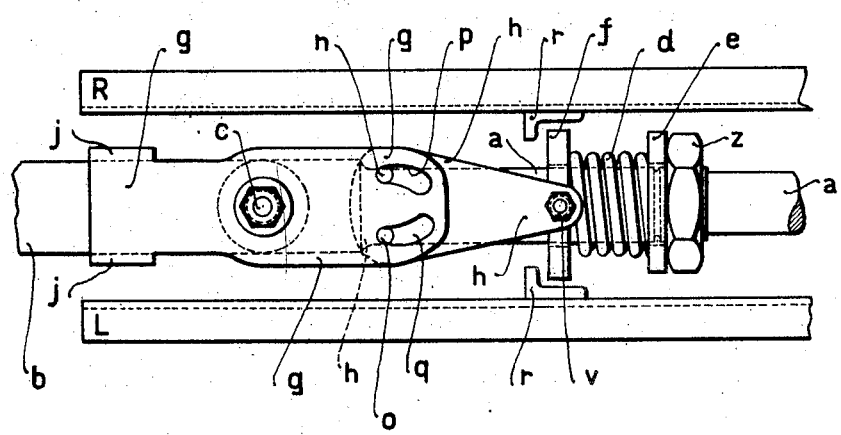

Several forms of construction for such a re-positioning device are illustrated, by way of example, in the accompanying drawings wherein:—Figures 1 and 2 are, respectively a side elevation and a plan view of one form of construction, Figures 3 and 4 are similar views of a second form, while Figures 5 and 6 show two further modified forms, both in plan.

The reference character $a$ designates the drawbar members (shown only in part in Figures 1, 4 and 6) which are supported from the truck and which, when subjected to tractive efforts or buffer shocks, are displaceable, under spring control along the longitudinal axis of the vehicle. For the rest these drawbar members may be constructed in any desired manner and may conveniently form part of a continuous combined drawbar and buffer system.

Reference $b$ designates the laterally movable shaft of a coupling head of any desired form, this shaft being connected to the drawbar members in known manner, by means of a vertical bolt $c$, or otherwise.

$d$ is a spring serving for the replacement or adjustment of the shaft $b$ in its central position and preferably it is initially stressed so that only a slight increase of its compression causes it to function to return the shaft to the said central position. A boss $e$ on the member $a$ (or some other appropriate seating, such as the washer $e$ in Figure 6, or the like) serves as an abutment for the spring $d$. A collar plate $f$, slidable on $a$, bears on the spring $d$, while $k$ designates guide plates which may be provided for guiding the bolt $c$.

$g$ are plates, one of which is applied above and the other beneath the coupling head shaft $b$. These plates are, by means of screws $i$ or otherwise, connected or secured to the shaft $b$, so that they follow, the oscillations thereof. During such movements better support can be obtained by the bolt $c$ extending through these plates $g$. Where this bolt is present and when the plates $g$ are provided with lugs $j$ embracing the shaft $b$ on both sides, further connection of the plates $g$ to the shaft $b$, as, for instance by means of the screws $i$ is in the circumstances not necessary.

Rod-like or other members $h$ are pivotally connected to the plates $g$ and collar plate $f$, whereby the latter is so secured to the plates that it can only slide along the drawbar member, from the position of rest, in a direction towards the spring abutment $e$ when the spring $d$ is compressed.

In Figures 1 and 2 the reference character $l$ designates small washers which, by means of nuts $m$, are secured upon the rods $h$ which extend through openings in the collar plate $f$, and against which the said collar plate is forced by the spring $d$. By reason of their shape, these washers permit lateral oscillation of the members $h$ relatively to the collar plate $f$; they may, however, be omitted if such lateral oscillations be provided for by appropriate formation of the bearing surfaces between the collar plate *f* and nuts *m*.

In Figures 3 and 4 the same purpose is fulfilled by providing at the top and at the bottom of the collar plate *f*, stud-like projections *t* of circular cross-section, which extend through openings in the members *h*, the latter being retained in place by nuts *v*. This method of connecting the collar plate *f* to the members *h* may be employed also in the form of construction shown in Figures 1 and 2.

Figures 3 and 4 also show a pivotal connection of the parts *g* and *h* effected by means of pins *n* and *o* which are slidable in appropriately formed elongated slots *p* and *q*.

Figure 5 illustrates a form of construction of the re-positioning device in which the drawbar and buffer mechanism is not continuous. In this arrangement *w* indicates the traction and buffer springs proper (which act on the vehicle frame), together with the spring box, the co-related transverse strut, and so forth, while *a* designates the drawbar and buffer member which is slidable only in the longitudinal direction. This member is constructed in the form of a bow with a rod-like extension, whereon the repositioning spring *d* and the sliding collar plate *f* are arranged. *y* is an abutment of any desired form, secured to the vehicle frame.

For the members *g*, *h* and *f*, respectively, the form of construction shown in Figures 3 and 4 has been chosen; they may, however, also be constructed according to Figures 1 and 2.

In Figure 6 the thrust collar *e* for the spring *d* is secured on the member *a* by means of a nut *z*, or otherwise.

In the forms of construction shown in Figs. 3 to 6 the slots *p* and *q* may be provided either in the members *h* or in the members *g*; in the former case the pins *n* and *o* are located in the members *g*, in the latter they are in the members *h*. (In Figures 3 to 5 these pins are shown as located in the parts *g* while in Figure 6 they are mounted on the parts *h*.)

If the connection of the coupling head shaft *b* to the member *a* be such that the latter does not overlap the former, then the members *g* may be omitted and in such case, instead of using the above described means of connection between the members *h* and the members *g*, the parts *h* may be furnished with a similar means of connection to the inner end of the coupling head shaft *b*.

The device operates as follows:—

In the form of construction according to Figures 1 and 2 the plates *g* set themselves at an angle to the members *h* when the coupling head shaft swings outwards, the distance of separation of the collar plate *f* from the abutment *e* is reduced and thus the spring *d* is compressed. When the lateral stress on the coupling head shaft is relieved, that is to say, when the vehicle is uncoupled, the spring *d* forces the collar plate *f* back into its position of rest, whereby the members *h* and *g* together with the coupling head shaft *b* connected to the latter are returned to the central position.

The form of construction according to Figures 3 and 4 operates in a similar manner. When the coupling head shaft is swung to the left (indicated in the drawings by reference character L) the members *h* are turned to the right by the pins *n* and drawn forward, the collar plate *f* being, thereby, also drawn forward so as to press upon the spring *d* while the pins *o* have enough play in the slots *q* not to interfere with such movement. When the swing of the coupling head shaft is towards the right (R in the drawings) the members *h* turn to the left on the pins *o* while the pins *n* travel along the slots *q*. In either case the spring *d* is stressed so that it tends to return the parts to their normal positions.

In the form of construction according to Figure 5, the manner of operation is like that of Figures 1 and 2 or Figures 3 and 4 according to which of the above described constructions for the parts *g* and *h* is adopted.

In the form of construction according to Figure 6, when the coupling head shaft swings out to the right the parts *g* press upon the pins *n* of the parts *h* which latter act on the collar plate *f* while the pins *o* have sufficient play in the slots *q* not to interfere with such movement. When the shaft swings out to the left the parts *g* press on the pins *o* of the parts *h* which react on the collar plate *f*, while the pins *n* have the necessary amount of play in the slots *p*. In both cases the spring *d* is stressed so that it tends to return the parts to their normal positions.

At an appropriate distance from the collar plate *f* may be arranged the top plates *r*, fast on the vehicle frame. In this case the collar plate *f* (see Figures 1 to 5), strikes against the stop plates *r* when a heavy impact takes place, either on the straight or at a curve, so that, in addition to the traction and buffer springs proper the spring *d* also, to a certain extent participates in absorbing shocks. Furthermore this method of construction has the advantage that when a heavy impact takes place on a curve the shaft of the coupling head is relieved of lateral stress due to the spring *d*. When the impact stress is removed the members *a* and *b* are again thrust out from the vehicle by the pressure of the traction and buffer spring proper, the collar plate *f* recedes from the stop plates $r$ and the spring $d$ again tends to re-position the several parts of the device. In this construction it is possible, by appropriately forming the pivotal connection of the members $h$ and $g$ (Figures 1 and 2) or the elongated slots $p$ and $q$ (Figures 3 to 5) to allow the parts $h$ to slide relatively to the parts $g$ substantially without hindrance, when the collar plate $f$ is arrested by the stop plates $r$.

In the arrangement shown in Figure 6 the stop plates $r$ may be located in the space in front of the collar plate $f$, the requisite provision being made accordingly for sliding the parts $h$ in relation to the parts $g$. The action when powerful tractive efforts arise is then of the same nature as that previously described with reference to impact stresses.

What we claim is:—

1. A re-positioning device for laterally oscillating coupling heads on railway vehicles, comprising a spring supported on a part of the draw bar mechanism which is displaceable only along the length of the vehicle, a thrust collar for this spring slidable on the said part of the draw bar mechanism, connecting members between this thrust collar and the coupling head shaft, which connecting members are adapted to swing relatively to the said shaft and to the said thrust collar and operate to press said collar against the spring, so that when the coupling head shaft swings outwards, the collar is moved towards the opposing seating for said spring stressing the spring and causing it to tend to replace the parts in their normal positions.

2. A re-positioning device for laterally oscillating coupling heads on railway vehicles comprising a spring supported on a part of the draw-bar mechanism which is displaceable only along the length of the vehicle, a thrust collar for this spring slidable on the said part of the draw-bar mechanism, connecting members between this thrust collar and parts secured to the coupling head shaft, which connecting members are adapted to swing relatively to the parts secured to the coupling head shaft and relatively to the said thrust collar and which operate to press said collar against the spring, so that when the coupling head shaft swings outwards the collar is moved towards the opposing seating for said spring, stressing the spring and causing it to tend to replace the parts in their normal positions.

3. A re-positioning device for laterally oscillating coupling heads on railway vehicles, comprising a spring supported on a part of the drawbar mechanism which is displaceable only along the length of the vehicle, a thrust collar for this spring, slidable on the said part of the drawbar mechanism, connecting the members between this thrust collar and the coupling head shaft which connecting members are adapted to swing relatively to the said shaft and to the said collar and which operate to press said collar against the spring and compress the latter, so that when the coupling head shaft swings outwards, the collar is moved towards the opposing seating for said spring, stressing the spring and causing it to tend to replace the parts in their normal positions.

4. A re-positioning device for laterally oscillating coupling heads on railway vehicles, comprising a spring supported on a part of the drawbar mechanism which is displaceable only along the length of the vehicle, a thrust collar for this spring, slidable on the said part of the drawbar mechanism connecting members between this thrust collar and parts secured to the coupling head shaft, which connecting members are adapted to swing relatively to the parts secured to the coupling head shaft and relatively to the said thrust collar, and which operate to press said collar against the spring and compress the latter, so that when the coupling head shaft swings outwards, the collar is moved towards the opposing seating for said spring, stressing the spring and causing it to tend to replace the parts in their normal positions.

5. A re-positioning device for laterally oscillating coupling heads on railway vehicles, comprising a spring supported on a part of the drawbar mechanism which is displaceable only along the length of the vehicle, a thrust collar for this spring slidable on the said part of the drawbar mechanism, connecting members between this thrust collar and the coupling head shaft, which connecting members are adapted to swing relatively to the said shaft and to the said thrust collar, so that when the coupling head shaft is swung outwards, the collar is moved towards the opposing seating for said spring, stressing the spring and causing it to tend to replace the parts in their normal positions, a stop plate on the frame of the vehicle, separated by a small clearance from the said thrust collar, which latter, when the drawbar device is moved towards the said stop plate, contacts with the same, whereby in addition to the drawbar springs proper, the aforesaid repositioning spring co-operates to absorb shocks applied to the drawbar mechanism.

6. A re-positioning device for laterally oscillating coupling heads in railway vehicles, comprising a spring supported on a part of the drawbar mechanism which is displaceable only along the length of the vehicle, a thrust collar for this spring slidable on the said part of the drawbar mechanism, connecting members between this thrust collar and parts secured to the coupling head shaft which connecting members are adapted to swing relatively to the parts secured to the coupling head shaft and relatively to the said thrust collar, so that when the coupling head shaft is swung outwards, the collar is moved towards the opposing seating for said spring, stressing the spring and causing it to tend to replace the parts to their normal positions, a stop plate on the frame of the vehicle, separated by a small clearance from the said thrust collar, which latter, when the drawbar device is moved towards the said stop plate, contacts with the same, whereby in addition to the drawbar springs proper, the aforesaid re-positioning spring co-operates to absorb shocks applied to the drawbar mechanism.

In testimony that we claim the foregoing as our invention, we have signed our names.

MAXIMILIAN ALMA.
CARL EGON ALMA.